United States Patent
Kumar

(10) Patent No.: US 7,910,032 B2
(45) Date of Patent: Mar. 22, 2011

(54) PROCESS FOR MANUFACTURING A FLEXIBLE PACKAGING LAMINATE FOR FILLING LIQUIDS IN POUCHES SUCH AS EDIBLE OIL POUCHES

(75) Inventor: Mukul Kumar, Gurgaon (IN)

(73) Assignee: Cargill India Private Limited, Gurgaon (Haryana) (IN)

( * ) Notice: Subject to any disclaimer, the term of this patent is extended or adjusted under 35 U.S.C. 154(b) by 840 days.

(21) Appl. No.: 11/813,225

(22) PCT Filed: Dec. 14, 2005

(86) PCT No.: PCT/IN2005/000422
§ 371 (c)(1),
(2), (4) Date: Jul. 2, 2007

(87) PCT Pub. No.: WO2006/064518
PCT Pub. Date: Jun. 22, 2006

(65) Prior Publication Data
US 2008/0286508 A1    Nov. 20, 2008

(30) Foreign Application Priority Data
Dec. 14, 2004 (IN) .......................... 2474/DEL/2004

(51) Int. Cl.
*B29C 55/00* (2006.01)
*B29C 71/00* (2006.01)
*B29C 47/00* (2006.01)

(52) U.S. Cl. .................. 264/173.15; 264/132; 264/146; 264/173.12; 264/173.14; 264/209.4; 264/234; 264/259; 264/514; 264/515; 156/244.13; 428/35.2; 428/35.7

(58) Field of Classification Search .................. None
See application file for complete search history.

(56) References Cited

U.S. PATENT DOCUMENTS
4,578,316 A * 3/1986 Clauson et al. ............... 428/516
(Continued)

FOREIGN PATENT DOCUMENTS
GB        2370808          7/2002

OTHER PUBLICATIONS
Derwent Abstract Accession No. 2004-575279/56, JP2004216740 A (Dainippon Printing Co Ltd) Aug. 5, 2004.
(Continued)

*Primary Examiner* — Jeffrey Wollschlager
(74) *Attorney, Agent, or Firm* — Caesar, Rivise, Bernstein, Cohen & Pokotilow, Ltd.

(57) ABSTRACT

The present invention provides an exemplary process for manufacturing a flexible packaging laminate into a pouch for containing liquids such as edible oil. The process includes taking granules of polypropylene and medium density polyethylene in a proportion of 1-1.5:1.5-2.5, —melting the granules at 200-230 degrees Celsius in a 3 layer blown film extruder to form a co-extruded film, —printing the film by a Rotogravure printing technique at 40-60 degrees Celsius, —laminating the printed film with a conventional 5 layer co-extruded nylon film at 60-80 degrees Celsius, —curing the laminated film at 35-45 degrees Celsius for at least 2 days, —and slitting the cured laminated film to a desired size for using with a Form Fill Seal machine (FFS Machine) at 160-180 degrees Celsius, to make pouches that hold liquids, such as edible oil.

2 Claims, 1 Drawing Sheet

U.S. PATENT DOCUMENTS

| | | | |
|---|---|---|---|
| 4,995,927 A | 2/1991 | Garrett | |
| 6,117,465 A | 9/2000 | Falla | |
| 6,500,559 B2 * | 12/2002 | Hofmeister et al. | 428/474.4 |
| 6,667,082 B2 * | 12/2003 | Bamore et al. | 428/34.8 |
| 6,794,021 B2 * | 9/2004 | Bader | 428/215 |
| 6,979,495 B2 * | 12/2005 | Keung et al. | 428/476.1 |
| 7,252,878 B2 * | 8/2007 | Watanabe et al. | 428/336 |
| 2002/0164470 A1 * | 11/2002 | Bader | 428/216 |
| 2004/0146226 A1 * | 7/2004 | Wolak et al. | 383/210 |
| 2005/0031233 A1 * | 2/2005 | Varanese et al. | 383/211 |

OTHER PUBLICATIONS

International Search Report of PCT/IN05/00422.

\* cited by examiner

PROCESS FOR MANUFACTURING A FLEXIBLE PACKAGING LAMINATE FOR FILLING LIQUIDS IN POUCHES SUCH AS EDIBLE OIL POUCHES

FIELD OF THE INVENTION

This invention relates to a process for manufacturing a flexible packaging laminate for filling liquids in pouches such as edible oil pouches.

BACKGROUND OF THE INVENTION

The conventional film or laminate for making edible oil pouches consists of either 3 layers co-extruded polyethylene film or 5 layers co-extruded nylon film or 2-layer laminate of polyester film and polyethylene film. These conventional films or laminates have the following dis-advantages

Dis-Advantages for Conventional Film

The film has poor print protection as printing is done on the surface of the film
The film print re-production and gloss are poor. This limits the scope to generate a premium image through the best possible printing on the film for enhancing the brand value

Dis-Advantages of Laminates

Laminates are very stiff because of inherent property of polyester film
Laminates are not flexible enough because of low elongation values
Pouch making from the laminates on Form Fill Seal Machine (FFS Machine) is also not operator friendly because of non-heat sealable nature of polyester film.

SUMMARY OF THE INVENTION

A benefit of this invention includes overcoming the disadvantages of the conventional film as well as the conventional laminates used for making flexible packaging laminates for filling liquids in pouches such as edible oil pouches.

To provide this benefit, this invention provides a process for manufacturing a flexible packaging laminates for filling liquids in pouches (e.g., edible oil in pouches) comprising:
  taking granules of polypropylene and medium density polyethylene in 1-1.5:1.5-2.5 ratio,
  melting the granules at 200-230 degrees (deg.) Celsius(C) in 3 layer blown film extruder to form a three layer co-extruded film,
  printing the film by a Rotogravure printing technique at 40-60 degrees Celsius,
  laminating the printed film with a conventional 5 layer co-extruded nylon film at 60-80 degrees Celsius,
  curing the laminated film at 35-45 degrees Celsius for at least 2 days,
  slitting the laminated film to the desired size for using on a Form Fill Seal machine (FFS Machine) at 160-180 degrees Celsius for making pouches to fill liquids such as edible oil.

BRIEF DESCRIPTION OF SEVERAL VIEWS OF THE DRAWINGS

The following detailed description of preferred embodiments of the invention will be better understood when read in conjunction with the following drawings, in which like-referenced numerals designate like elements, and wherein.

DETAILED DESCRIPTION OF PREFERRED EMBODIMENTS

Figure 1:
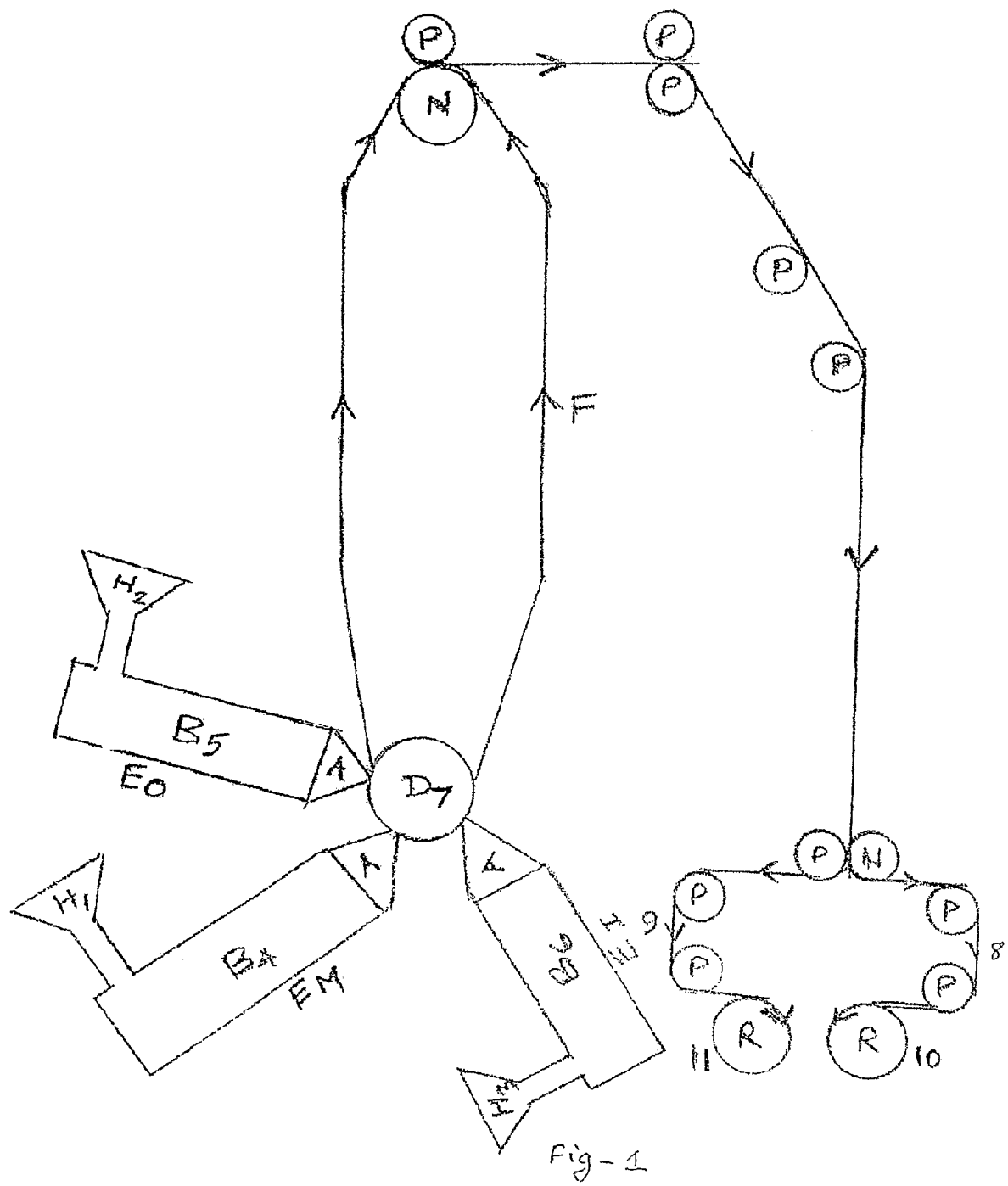
FIG. 1 is a plan view of a first example of the flexible packaging laminate process in accordance with the preferred embodiments of the present invention.

The invention will now be described with reference to the following example:

EXAMPLE

Taking polypropylene granules in hopper (H1) for the middle layer of blown film co-extruder (EM) and further taking medium density polyethylene granules in the other two hoppers (H2, H3) of outer and inner layer of said co-extruder (E0, E1) in the ratio 1:2. The said co-extruders with hoppers are shown in FIG. 1 of the accompanying drawings.

The hoppers (H1, H2) and (H3) are connected to barrels B4, B5 and B6. The granules are melted in the barrels of the co-extruder at 230 degrees Celsius. The co-extruded melted layers passes through the die (D7) and are blown in the form of a balloon (F). The balloon (F) is cut into two webs. The two webs are re-mound into two re-winders (R10, R11) for printing. One of the roll (R10) is taken for a Roto Graver Printing Technique (RGP technique) at 50 degrees, Celsius. The printed film is laminated with a conventional five layer co-extruded nylon film at 70 degrees Celsius, and thereafter cured at 40 degrees Celsius. The laminated film is then slit to a desired size for use with a conventional Form Filled Seal machine (not shown) at 170 degrees Celsius to make a pouch fillable with a fluid, such as, edible oil.

While the invention has been described in detail and with reference to specific embodiments thereof, it will be apparent to one skilled in the art that various changes and modifications can be made therein without departing from the spirit and scope thereof.

I claim:

1. A process for manufacturing a flexible packaging laminate pouch adapted for housing liquids including edible oil, comprising:
  taking granules of polypropylene and medium density polyethylene in a 1-1.5:1.5-2.5 ratio;
  melting said granules at 200-230 deg. C in a 3 layer blown film extruder to form a three layer co-extruded film;
  printing said film by a Roto Graver printing technique at [about] 40-60 deg. C;
  laminating said printed film with a five layer co-extruded nylon film at 60-80 deg. C;
  curing said laminated film at 35-45 deg. C for at least 2 days; and
  slitting said cured laminated film to a desired size for using on a Form Fill Seal machine at 160-180 deg. C to make the pouch for filling with liquids.

2. The process for manufacturing a packaging laminates pouch of claim 1, wherein the co-extruded film is a three layer film including a middle layer of polypropylene, an inner layer of polyethylene adjacent a first side of said middle layer, and an outer layer of polyethylene adjacent a second side of said middle layer opposite said inner layer.

* * * * *